(12) United States Patent
Mason

(10) Patent No.: US 7,024,788 B2
(45) Date of Patent: Apr. 11, 2006

(54) DATUM POINT ADAPTOR FOR VEHICLE GAUGING APPARATUS

(76) Inventor: James Herbert Mason, 2 Wellington Street, Narabeen, NSW 2101 (AU)

( * ) Notice: Subject to any disclaimer, the term of this patent is extended or adjusted under 35 U.S.C. 154(b) by 84 days.

(21) Appl. No.: 10/343,252

(22) PCT Filed: May 2, 2001

(86) PCT No.: PCT/AU01/00493

§ 371 (c)(1),
(2), (4) Date: Feb. 4, 2003

(87) PCT Pub. No.: WO01/84071

PCT Pub. Date: Nov. 8, 2001

(65) Prior Publication Data

US 2003/0150124 A1 Aug. 14, 2003

(30) Foreign Application Priority Data

May 2, 2000 (AU) .............................................. PQ7208

(51) Int. Cl.
G01D 21/00 (2006.01)

(52) U.S. Cl. .......................... 33/608; 33/645; 33/DIG. 1

(58) Field of Classification Search ............... 33/288, 33/203.18, 520, 608, 613, 645, 572, DIG. 1, 33/533
See application file for complete search history.

(56) References Cited

U.S. PATENT DOCUMENTS

| | | | |
|---|---|---|---|
| 2,112,917 A | 4/1938 | Linn | |
| 2,442,425 A | 6/1948 | Merrill et al. | |
| 2,563,527 A | 8/1951 | Gingrich et al. | |
| 2,717,020 A | 9/1955 | Dobias | |
| 2,845,718 A | 8/1958 | Keymer | |
| 2,971,261 A * | 2/1961 | Michie | ........................ 33/429 |
| 3,330,044 A * | 7/1967 | MacMillan | ............... 33/203.18 |
| 3,528,178 A | 9/1970 | Kunzler | |
| 3,566,476 A | 3/1971 | McWhorter | |
| 3,566,666 A | 3/1971 | Berendt et al. | |
| 3,624,914 A * | 12/1971 | Kosteriva | ................... 33/203.2 |
| 3,626,747 A | 12/1971 | Rouis | |
| 3,776,022 A | 12/1973 | Lionello | |
| 3,835,692 A | 9/1974 | Hoffman | |
| 3,835,693 A | 9/1974 | Majersky | |

(Continued)

FOREIGN PATENT DOCUMENTS

| | | |
|---|---|---|
| AU | 249933 | 10/1963 |
| AU | 71442/74 | 1/1976 |
| AU | 19014/88 | 10/1988 |
| AU | 30233/92 | 6/1993 |
| GB | 2 015 740 | 9/1979 |
| GB | 2 037 992 | 7/1980 |
| GB | 2 084 327 | 4/1982 |
| GB | 0 085 253 | 8/1983 |
| GB | 2 149 536 | 6/1985 |
| JP | 5 614 8002 | 11/1981 |
| WO | 504 756 | 5/1939 |
| WO | WO 8 101 740 | 6/1981 |
| WO | WO 8 500 219 | 1/1985 |
| WO | WO 93/07446 | 4/1993 |
| WO | WO 94/02801 | 2/1994 |
| WO | WO 97/21076 | 6/1997 |

Primary Examiner—Diego Gutierrez
Assistant Examiner—Amy R. Cohen
(74) Attorney, Agent, or Firm—Jordan and Hamburg LLP

(57) ABSTRACT

A datum point adaptor (1) is secured to reference points such as holes, bolts or studs, which form measurement reference points for measuring the alignment of vehicles, especially in the case of collisions and panel beating. The datum point adaptor (1) comprises securing means (3) to secure the adaptor to the datum point, a concave face (4) having a central measurement point (5) and a pivot (6) adapted to engage the central measuring point (5) and pivot 360° to allow measurements to be made to other reference points. The securing means (3) and pivot (6) can be magnetic.

9 Claims, 2 Drawing Sheets

U.S. PATENT DOCUMENTS

| | | | | |
|---|---|---|---|---|
| 3,869,804 | A | 3/1975 | Friend | |
| 4,151,737 | A | 5/1979 | Specktor | |
| 4,159,574 | A | 7/1979 | Samuelsson et al. | |
| 4,176,463 | A * | 12/1979 | Ringle | 33/203.18 |
| 4,262,519 | A | 4/1981 | Mason | |
| 4,321,754 | A | 3/1982 | Colby | |
| RE31,000 | E * | 7/1982 | LeGrand et al. | 33/608 |
| 4,339,913 | A | 7/1982 | Vogelsberg | |
| 4,407,073 | A | 10/1983 | Nilsspm et al. | |
| 4,408,399 | A | 10/1983 | Darwood et al. | |
| 4,453,315 | A | 6/1984 | Mosiman et al. | |
| 4,479,305 | A | 10/1984 | Wendl et al. | |
| 4,523,384 | A | 6/1985 | Giacomini | |
| 4,577,413 | A | 3/1986 | Mason | |
| 4,601,105 | A * | 7/1986 | Yamazaki et al. | 33/600 |
| 4,610,093 | A | 9/1986 | Jarman et al. | |
| 4,621,435 | A | 11/1986 | Higginbotham | |
| 4,630,379 | A * | 12/1986 | Wickmann et al. | 33/288 |
| 4,640,015 | A | 2/1987 | Mason | |
| 4,683,663 | A | 8/1987 | Sarauer | |
| 4,719,704 | A * | 1/1988 | Hogg | 33/288 |
| 4,756,089 | A | 7/1988 | Danielsson | |
| 4,771,544 | A | 9/1988 | Riutta | |
| 4,800,651 | A * | 1/1989 | Hanlon | 33/203.18 |
| 4,958,439 | A * | 9/1990 | Dehn | 33/608 |
| 5,003,703 | A * | 4/1991 | Swanson | 33/638 |
| 5,125,164 | A * | 6/1992 | Fournier et al. | 33/608 |
| 5,131,257 | A | 7/1992 | Mingardi | |
| 5,193,288 | A * | 3/1993 | Stifnell | 33/608 |
| 5,343,628 | A | 9/1994 | Ham | |
| 5,430,951 | A | 7/1995 | Jacky | |
| 5,435,071 | A * | 7/1995 | Bagwell | 33/506 |
| 5,507,101 | A | 4/1996 | Mason | |
| 5,647,139 | A * | 7/1997 | Richardson | 33/608 |
| 6,598,308 | B1 * | 7/2003 | Johansson et al. | 33/608 |
| 6,775,639 | B1 | 8/2004 | Mason | |
| 1,597,357 | A1 | 3/2006 | Godfrey | |
| 2003/0150124 | A1 | 8/2003 | Mason | |

* cited by examiner

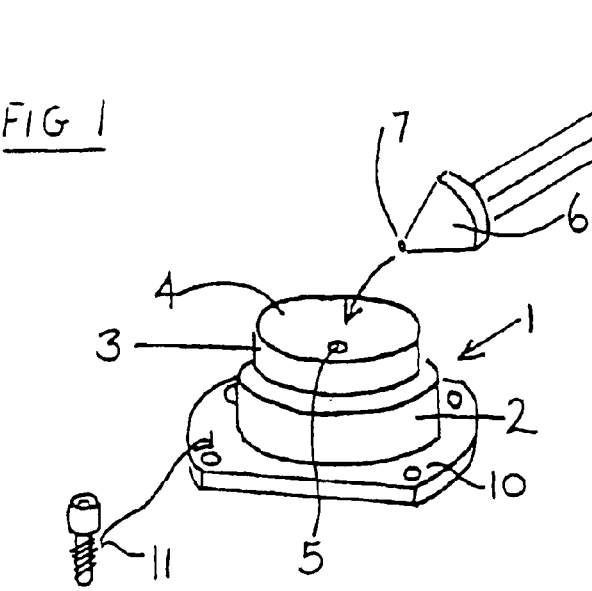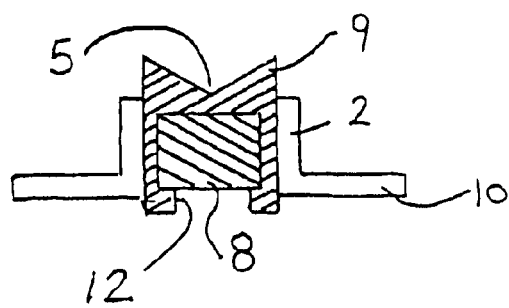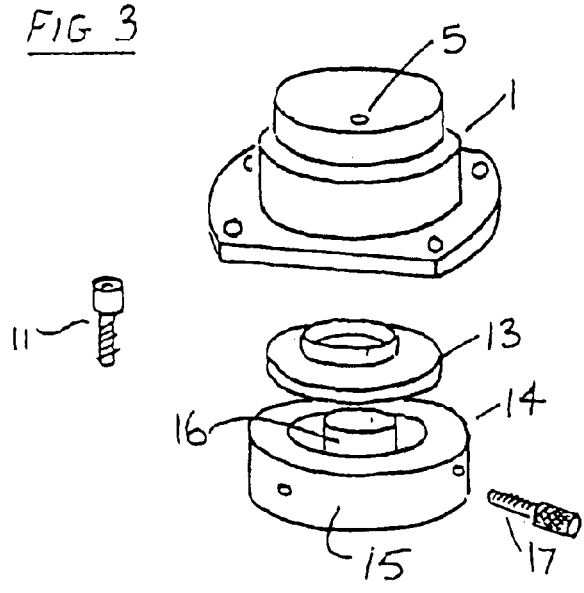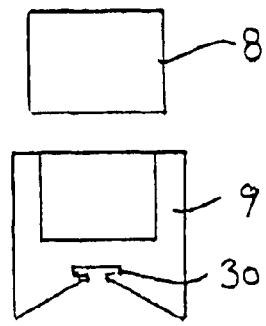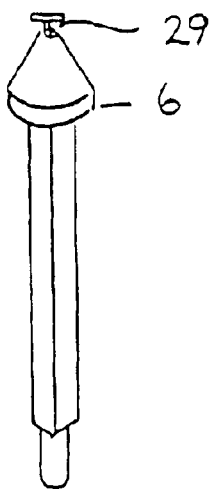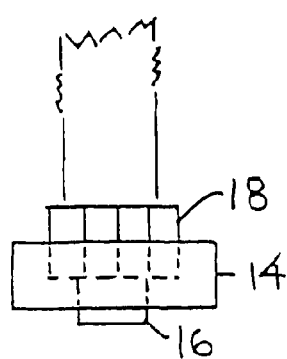

DATUM POINT ADAPTOR FOR VEHICLE GAUGING APPARATUS

FIELD OF THE INVENTION

The present invention relates generally to an apparatus for the determination of relative alignment of structural members, and in particularly for use in the automotive industry. The invention has been developed primarily for use in the automotive industry and more particularly for the panel beating trade. The invention will therefore be described with reference thereto. However it will be appreciated that the invention is not limited to this particular field of use.

BACKGROUND OF THE INVENTION

It is common practice in the manufacture of motor vehicles to provide specific datum points on the vehicle to check the alignment of the vehicle. This is particularly useful in repairing vehicles after collisions, to ensure correct alignment. These datum points can take the form of holes in the chassis, bolt heads, nuts or studs, pins, lugs or suspension mounting points. The datum points vary significantly from model to model. shaped pivot and is adapted to pivot about said central measurement point, the base of said cone adapted to engage with a measuring apparatus.

Preferably the housing and the concave face are made of non magnetic material and a magnet is enclosed within the housing.

Preferably the concave face is formed as a hollow cone.

In another form the invention comprises a datum point adaptor comprising;

means to secure the adaptor to a datum point on a vehicle;

a housing having a concave face having a central measurement point;

a key hole located at the central measurement point; and a pivot having an engagement means located at its apex, adapted to engage with said key hole such that its apex centres on the said central measurement point and is able to rotate about said central measurement point, and a base adapted to engage with a measuring apparatus.

BRIEF DESCRIPTION OF THE DRAWINGS

The invention will now be described with reference to the accompanying drawings, in which:

FIG. 1 illustrates a datum point adaptor according to one embodiment of the present invention;

FIG. 2 illustrates a cross sectional view of a datum point adaptor according to another embodiment of the present invention;

FIG. 3 illustrates a modification of the datum point adaptors shown in figures;

FIG. 4 illustrates the attachment of the datum point adaptor shown in FIG. 3 to a bolt;

FIG. 7 illustrates a datum point adaptor according to a further embodiment of the present invention.

EMBODIMENTS OF THE PRESENT INVENTION

Figure 5:
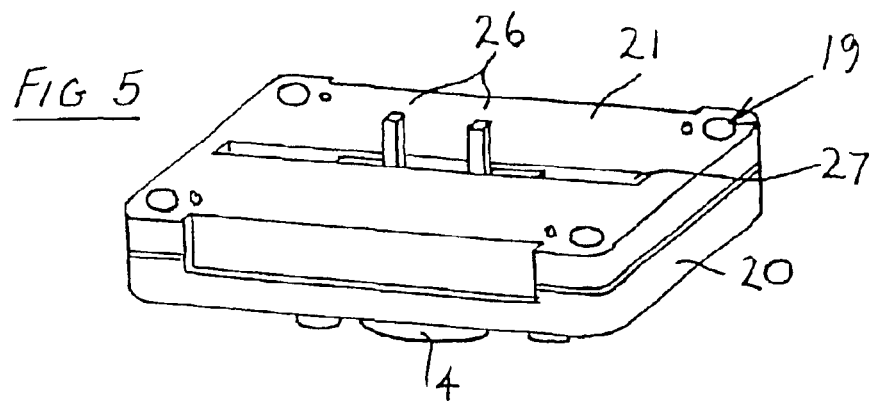
FIG. 5 illustrates a datum point adaptor according to a further embodiment of the present invention.

As shown in FIG. 1, one embodiment of the present invention comprises a datum point adaptor (1) having a non magnetic housing (2) holding a magnet (3); preferably the housing (2) is made from plastics. The magnet (3) has a concave upper surface (4), with a central measuring point (5); preferably the upper surface (4) forms a conical hollow, with the lowest point of the hollow being the central measuring point (5). The central measuring point (5) can also be a small indent.

A cone shaped pivot (6) engages in the concave upper surface (4), with its apex (7) engaging in and pivoting around the central measuring point (5). The cone shaped pivot (6) is attached to a measuring device (not shown), whereby there is provided a relatively friction free pivot so that the measuring device can measure from that datum point width, length, diagonals height and other datum measurements at 360° around the adaptor.

A modified datum reference point adaptor (1) is shown in FIG. 2. This datum reference point adaptor (1) is identical the datum reference point adaptor shown in FIG. 1, except that it has a cylindrical magnet (8) which sits within a non magnetic cover (9), which has the concave upper surface (4).

Both of these adaptors (1) have a lower flange (10) having levelling screws (11) located at each corner, and a central opening (12).

In use the datum point adaptors (1) are placed over a reference bolt on the upper body of the vehicle and the bolt engages through the opening (12) onto the bottom of the magnet (3, 8); the opening being of the exact diameter as that of the bolt. The levelling screws are adjusted to level the flange (10), to correctly align the central measuring point (5) with the reference bolt.

As shown in FIG. 3 an adaptor washer (13) can be fitted into the opening (12) to align correctly on smaller bolts. For larger bolts, as shown in FIGS. 3 & 4, a larger connector (14) is used, This connector (14) comprises an outer nonmagnetic housing (15), with a central steel or the like insert (16). The nonmagnetic housing (15) has three centering screws (17).

Therefore in use the adaptor washer (13) and connector (14) are connected to the base of the datum point adaptor (1) with the steel insert (16) mating in the opening (12), by means of the magnetic attraction between the magnet (3, 8). The larger connector (14) is then positioned over the bolt head (18), where it is held in place by means of the magnet (3, 8). The centering screws (17) are adjusted to centre the adaptor (1), and with the aid of the cone shaped pivot (6) measurements can be taken.

Figure 6:
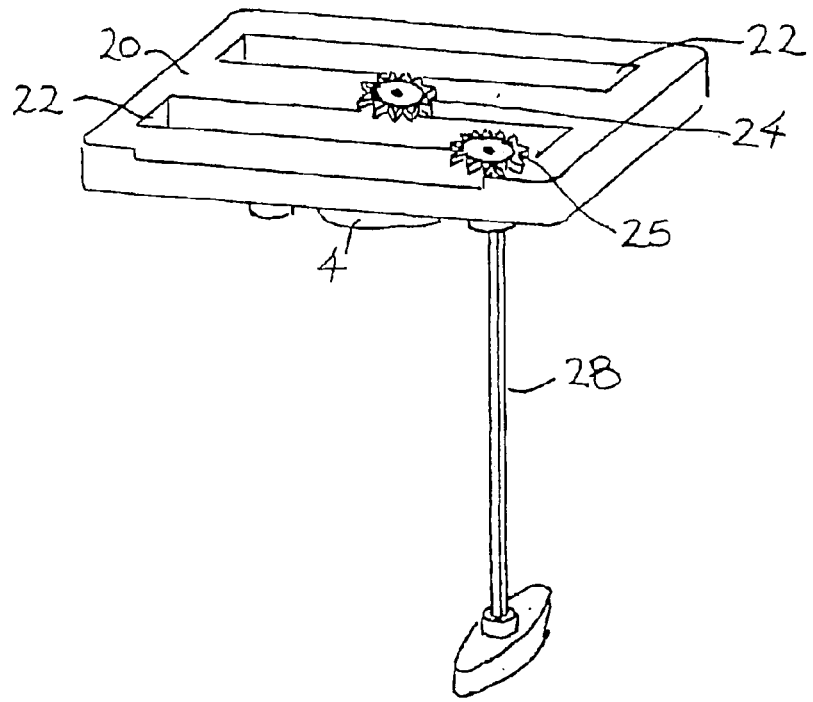
FIG. 6 illustrates an exploded view of the datum point adaptor shown in FIG. 5.

On some vehicles the reference points are in fact holes and a different datum point adaptor (19), as shown in FIGS. 5 & 6 is used. The datum point adaptor (19) comprises a two part nonmagnetic body (20 & 21). On the outside of the part (20) is located a magnet (3) as shown in FIG. 1 or a nonmagnetic cover (9) and magnet (8) arrangement, as shown in FIG. 2. The inside has two track ways (22) along which move two nonmagnetic racks (23), with a central pinion (24), and a drive pinion (25). The racks each also have a locating lug (26), which project through the slot (27) in the body part (21).

In use the drive pinion (25) is rotated by the tool (28), which in turn slides one of the racks (23) which notion is transferred via the central pinion (24) to the other rack (23), such both racks (23) move an equal distance from the central measuring point (5) of the datum point adaptor (19). Therefore the locating lugs (26) are positioned in the reference hole and the drive pinion (25) rotated to force the lugs (26) to engage against the periphery of the hole, to align the central measuring point (5) exactly with the centre of the hole.

Additionally magnets are located on each corner of the outer side of the body part (21) to assist in securing the adaptor (19) to the vehicle body.

What is claimed is:

1. A datum point adaptors, comprising:
   a housing including a concave face having a central measurement point;
   securing means for securing the adaptor to a datum point on a vehicle such that said central measurement point is substantially aligned with said datum point; and
   a substantially cone shaped pivot, having an apex and a base, said apex being engageable with said concave face such that said apex centers on said central measurement point for pivotable movement about said central measurement point, the base of said cone being engageable with a measuring apparatus for determining relative alignment of said vehicle in relation to said datum point.

2. A datum point adaptor according to claim 1, wherein said housing and said substantially cone shaped pivot incorporate respective elements adapted for mutual magnetic attraction, such that the apex of the substantially cone shaped pivot centers on the said central measurement point as a result of said magnetic attraction.

3. A datum point adaptor according to claim 2 wherein:
   the housing comprises a cover including the concave face said cover being made of nonmagnetic material; and
   a magnet is enclosed within the cover.

4. A datum point adaptor according to claim 1, wherein the concave face is formed as a hollow cone.

5. A datum point adaptor according to claim 1, wherein the central measuring point is an indent.

6. A datum point adaptor according to claim 2, wherein the adaptor is releasably securable to to the datum point by magnetic attraction.

7. A datum point adaptor, comprising:
   securing means for securing the adaptor to a datum point on a vehicle;
   a housing having a concave face having a central measurement point;
   a substantially cone shaped pivot having an apex and a base engageable with said concave face, a one of said housing and said substantially cone shaped pivot including a magnet and an other of said housing and said substantially cone shaped pivot being made of magnetic material, such that the apex of the substantially cone shaped pivot centers on said central measurement point as a result of the attraction between the housing and the substantially cone shared pivot and is pivotable about said central measurement point, the base of said cone being engageable with a measuring apparatus, the magnet of the adaptor securing the adaptor to a vehicle to be measured; and
   a connector having a steel core located in a housing, said connector including aligning screws to center the adaptor, said connector being is connected between the datum point adaptor and a reference bolt on the vehicle to be measured.

8. A datum point adaptor according to claim 1, wherein said securing include a key hole formation located in said housing at or adjacent the central measurement point, and a corresponding key formation in said pivot at or adjacent said apex, said key hole and key formations being mutually interchangeable to center the apex on said central measurement point while accommodating said pivotable movement.

9. A datum point adaptor, comprising:
   securing means for securing the adaptor to a datum point on a vehicle;
   a housing having a concave face having a central measurement point; and
   a substantially cone shaped pivot, having an apex and a base, said apex being engageable with said concave face such that said apex centers on said central measurement point for pivotable movement about said central measurement point, the base of said cone being engageable with a measuring apparatus;
   said adapter being securable in a reference hole, said housing having trackways formed therein, the securing means including two nonmagnetic racks adapted to slide along said trackways and which engage a central pinion therebetween, and a drive pinion to move said racks along said trackways, each of said racks having a lug which extends out of said housing remote from said concave face, such that in use the racks are moved along the trackways to abut the lugs on the periphery of the reference hole to hold the adaptor in the hole and to align the central measuring point with the center of the reference hole.

* * * * *